P. GILBERT.
PROPELLING AND LIFTING DEVICE FOR AEROPLANES.
APPLICATION FILED JUNE 1, 1911.

1,045,388.

Patented Nov. 26, 1912.
4 SHEETS—SHEET 3.

WITNESSES

INVENTOR

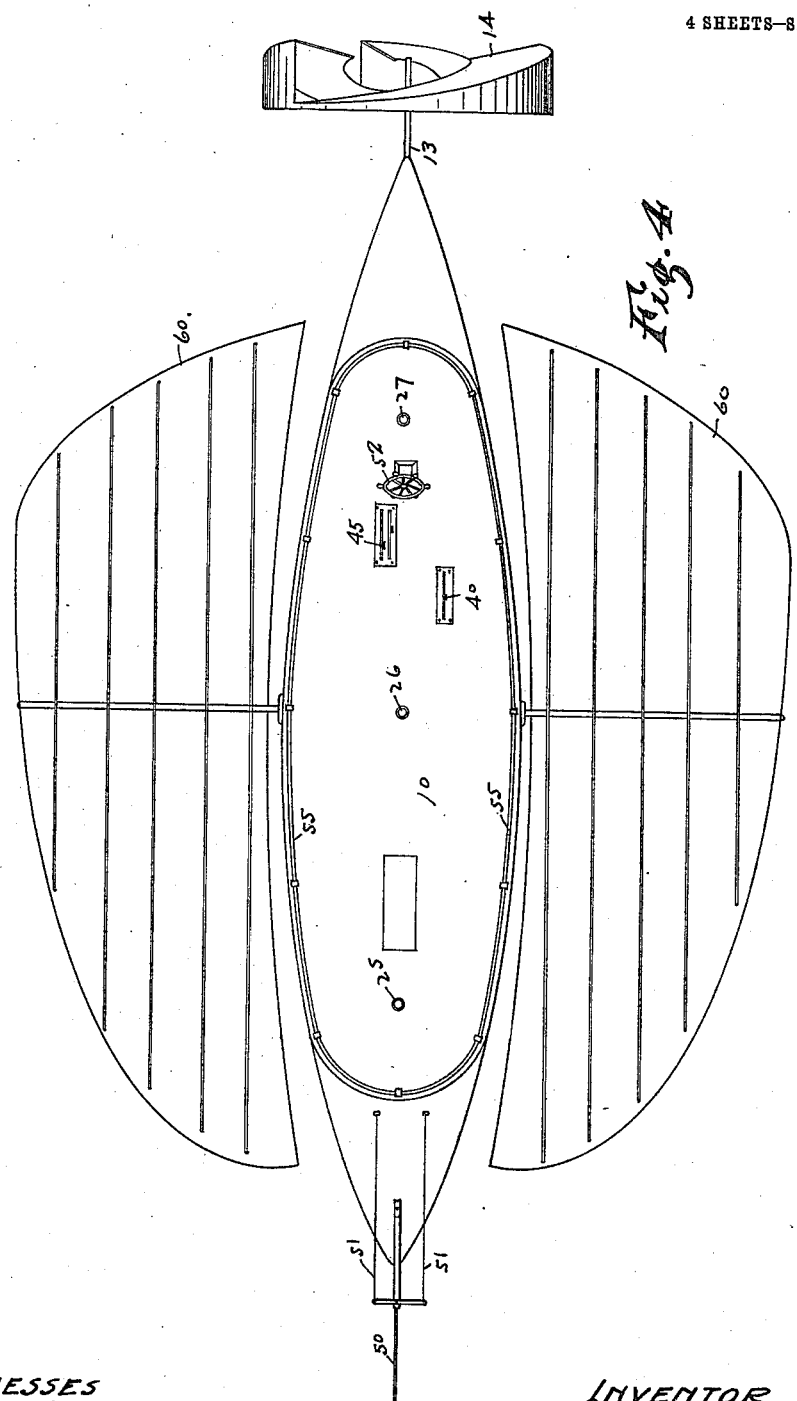

UNITED STATES PATENT OFFICE.

PHINEAS GILBERT, OF SPOKANE, WASHINGTON.

PROPELLING AND LIFTING DEVICE FOR AEROPLANES.

1,045,388.      Specification of Letters Patent.      Patented Nov. 26, 1912.

Application filed June 1, 1911. Serial No. 630,617.

*To all whom it may concern:*

Be it known that I, PHINEAS GILBERT, a citizen of the United States, residing at Spokane, in the county of Spokane and State of Washington, have invented certain new and useful Improvements in Propelling and Lifting Devices for Aeroplanes; and I do hereby declare the following to be a full, clear, and exact description of the invention, such as will enable others skilled in the art to which it appertains to make and use the same.

This invention relates to propelling and lifting devices for aeroplanes.

The object of the invention is to provide improved means for propelling and lifting an aeroplane or other form of airship.

A further object is to provide improved means for controlling a plurality of propelling devices constructed in accordance with my invention.

Other objects will appear from the following description and include the provision of improved mechanism for steering the device.

Figure 1:
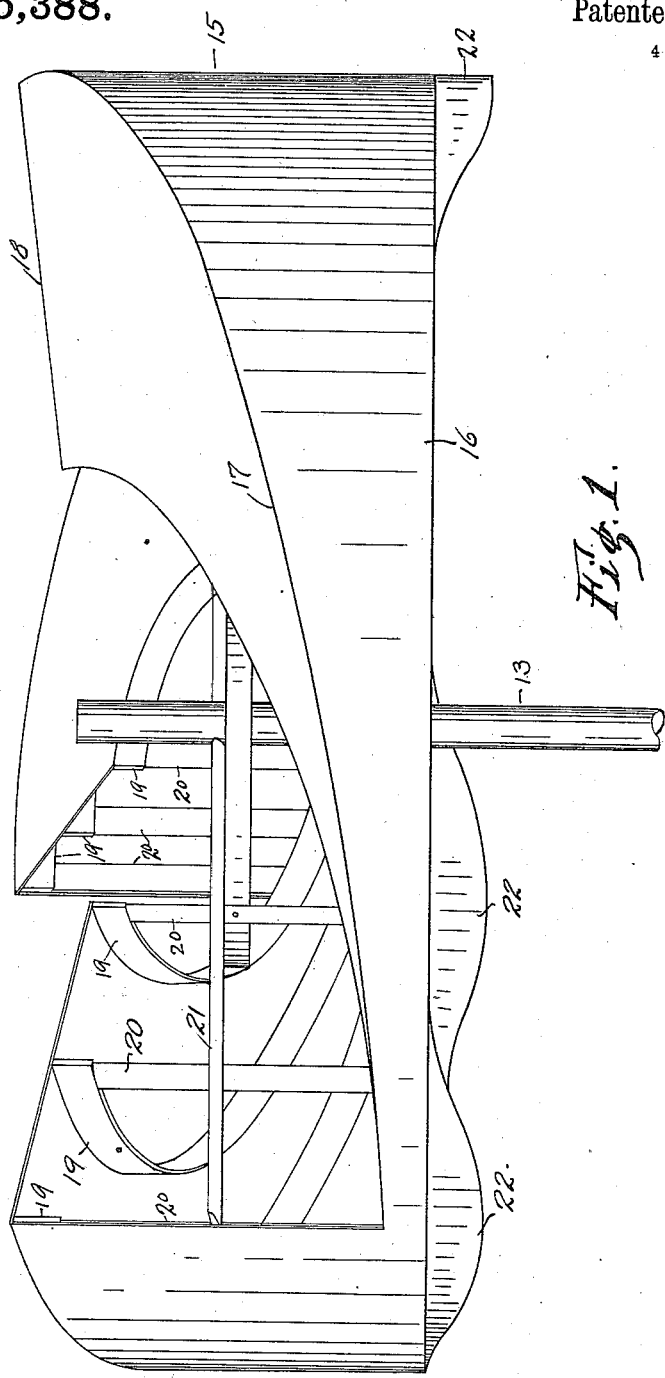
Figure 2:
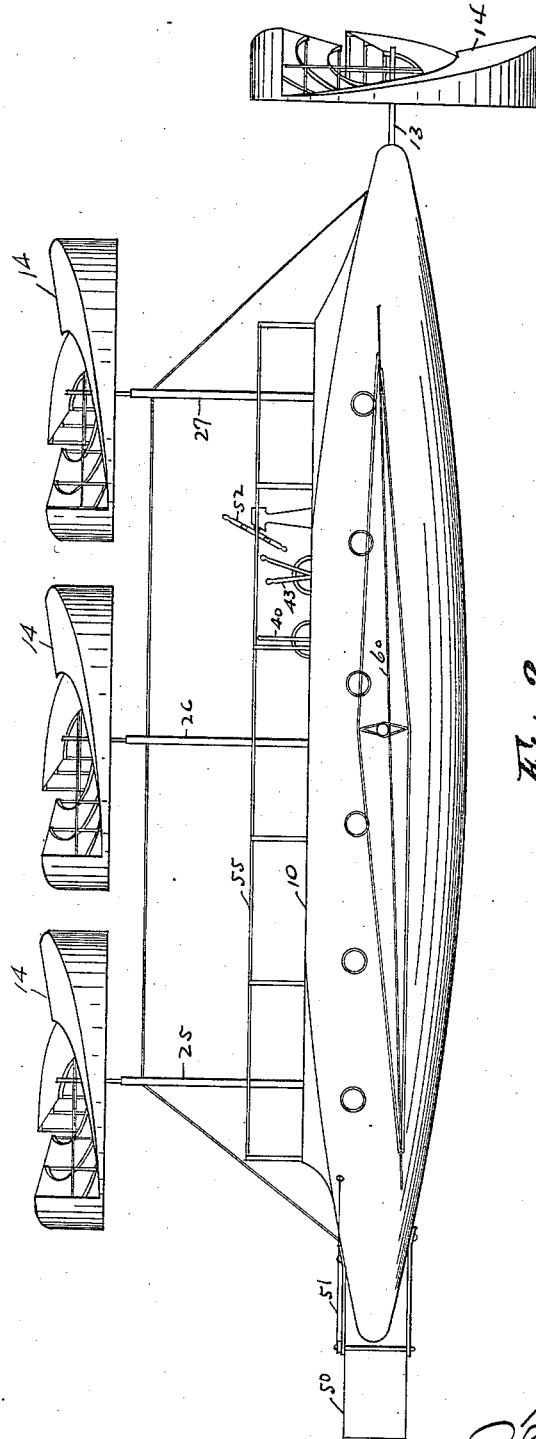
Figure 3:
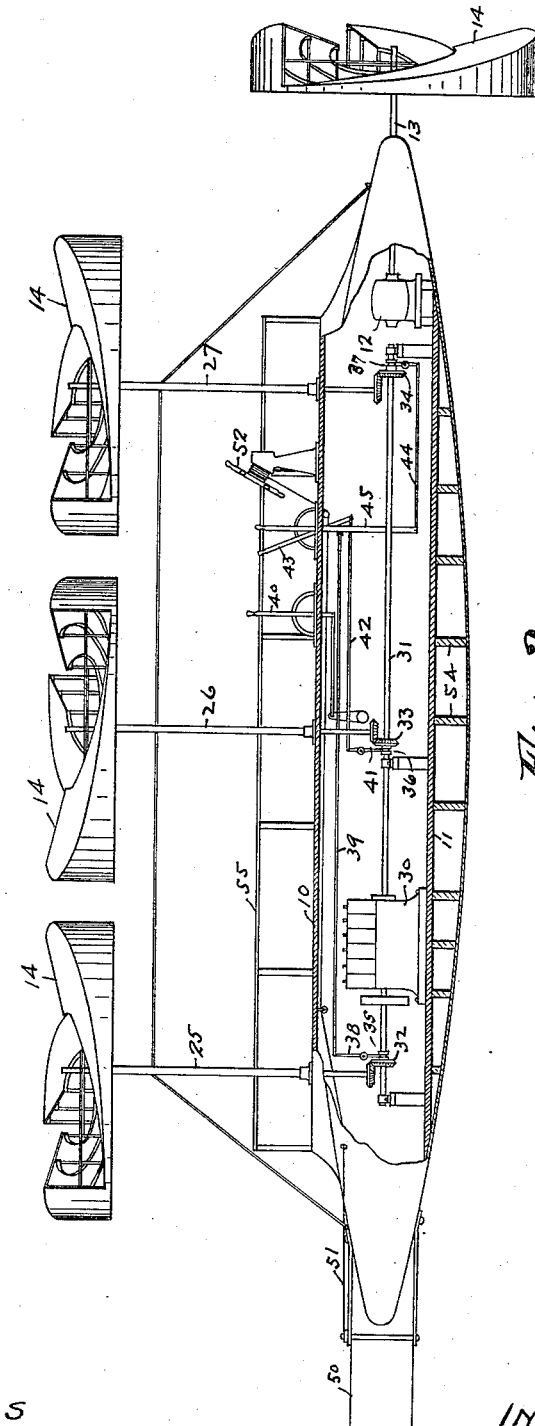

In the accompanying drawings forming a part of this application—Figure 1 is a side elevation of one of the propelling or lifting devices. Fig. 2 is a view partly in elevation showing a plurality of such devices mounted upon an aeroplane and arranged for lifting the latter and a further device arranged for propelling the air ship. Fig. 3 is a view similar to Fig. 2 but showing portions of the interior structure in section and elevation. Fig. 4 is a top plan view of the device.

In carrying out my invention, I provide a structure having a suitable deck or upper portion 10, constituting the top of a main compartment in which the driving and controlling mechanism is located.

A floor 11 extends substantially the full length of the body portion of the structure and supports the driving mechanism and the line shafting. A motor 12 is located at the rear of the main compartment and drives a shaft 13 carrying the rear propeller 14 constructed in accordance with my invention.

Propeller 14 is shown in detail in Fig. 1 and consists of a frame-work having a plurality of blades or lifting devices 15 with substantially straight sides 16 and inclined blade portions 17, terminating abruptly at the edge 18. These blades are stiffened on their under sides by means of ribs 19 which are secured to bars 20. These bars are in turn connected with the cross bars 21 carried by the propeller shaft 13 or by the vertical propeller shafts hereafter described. The arrangement specified provides a plurality of spiral planes mounted to revolve about a central axis. The planes are ribbed on the under side by virtue of the attachment of members 19 and tend to confine the air. A downwardly extending wing 22 is provided on the sides for the purpose of confining the air, at that place, within the scope of the planes, and is especially effective with reference to the elevating or lifting propellers. It is the intention that the planes of these propellers shall be revolved with sufficient rapidity to compress the air in front and give them lifting power.

The lifting propellers are on shafts 25, 26 and 27 and these shafts are arranged to be thrown into and out of operation by means of a clutch mechanism controlled by levers within reach of the aviator.

The motor 30 drives a line shaft 31 carrying beveled gears 32, 33 and 34 operated by clutches 35, 36 and 37. Clutch 35 is controlled by lever 38 connected with a rod 39 and the latter is operated by a hand lever 40. Clutch 36 is operated by lever 41 connected with a rod 42 operated by a hand lever 43. Clutch 37 is connected with a lever 44 operated by hand lever 45. It will thus be seen that each propeller shaft is under the control of the operator through a separate hand lever.

The steering rudder 50 at the front end is controlled by means of a cable 51 and a wheel 52 mounted above the deck and adjacent to the levers controlling the propellers.

The lower portion of the structure is provided with suitable transverse bracing members 54 beneath the floor proper and a railing 55 may be mounted above the deck as a suitable protecting device.

It is the intention to operate all of the lifting propellers in one direction or in alternate directions as desired, and it is obvious that the number of propellers is immaterial.

In Fig. 3 the blades of the central propeller have an inclination opposite to that of the adjacent propellers.

Rudders 60 extend laterally from the sides of the structure and are shown in plan in Fig. 4 and may be operated by any suitable mechanism.

What I claim is:

In a device of the class described a shaft, a plurality of inclined planes spaced therefrom and arranged spirally about the shaft, ribs for stiffening said planes, such ribs disposed on the under surface thereof, and downwardly extending sides secured to the outer edges of the planes for inclosing with said planes a body of air, and means projecting from said sides and constituting curved fin-like extensions thereof projecting in the direction of the sides for confining the air with reference to the planes.

In testimony whereof I affix my signature in presence of two witnesses.

PHINEAS GILBERT.

Witnesses:
R. E. PORTERFIELD,
GEO. F. PRESTEN.

Copies of this patent may be obtained for five cents each, by addressing the "Commissioner of Patents, Washington, D. C."